United States Patent
Zhi et al.

(10) Patent No.: US 12,034,154 B2
(45) Date of Patent: Jul. 9, 2024

(54) ARTIFICIAL ZINC FLUORIDE SOLID ELECTROLYTE INTERLAYER ENABLED COMMERCIAL-LEVEL AQUEOUS Zn METAL BATTERIES

(71) Applicant: CITY UNIVERSITY OF HONG KONG, Kowloon (HK)

(72) Inventors: Chunyi Zhi, Hong Kong (HK); Longtao Ma, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 0 days.

(21) Appl. No.: 17/561,273

(22) Filed: Dec. 23, 2021

(65) Prior Publication Data

US 2022/0199980 A1    Jun. 23, 2022

Related U.S. Application Data

(60) Provisional application No. 63/130,193, filed on Dec. 23, 2020.

(51) Int. Cl.
| | |
|---|---|
| *H01M 4/00* | (2006.01) |
| *H01M 4/04* | (2006.01) |
| *H01M 4/134* | (2010.01) |
| *H01M 4/36* | (2006.01) |

(52) U.S. Cl.
CPC ......... *H01M 4/366* (2013.01); *H01M 4/0423* (2013.01); *H01M 4/134* (2013.01); *H01M 2300/0002* (2013.01)

(58) Field of Classification Search
CPC ...... H01M 10/36; H01M 4/5825; H01M 4/50; H01M 4/0428
See application file for complete search history.

(56) References Cited

U.S. PATENT DOCUMENTS

2022/0278431 A1* 9/2022 Park ............... H01M 50/179

FOREIGN PATENT DOCUMENTS

| WO | WO-2019183224 A1 * | 9/2019 | ........ H01M 10/0569 |
| WO | WO-2020176787 A1 * | 9/2020 | ............. C23C 16/34 |

OTHER PUBLICATIONS

Chen, Materials and Methods for Components of Zinc-Ion Batteries, Sep. 2020, See the Abstract. (Year: 2020).*
Wang et al., Electrolytes for Rechargeable Zn-Metal Battery, Sep. 2019, See the Abstract. (Year: 2019).*

* cited by examiner

*Primary Examiner* — Cynthia H Kelly
*Assistant Examiner* — Monique M Wills

(57) ABSTRACT

A novel conversion-type rechargeable zinc (Zn) battery is constructed. A zinc fluoride ($Zn/ZnF_2$) interface provides an artificial solid electrolyte interlayer (SEI) at the Zn/electrolyte interface that allows plating of Zn dendrite free and protects the Zn metal anode from direct exposure to bulk aqueous electrolyte. This provides the advantage that the interfacial $Zn^{2+}$ ion transport is regulated, which controls nucleation distribution and the growth pattern of Zn deposition on the surface of the anode, and also improve inherent $H_2O/O_2$ resistant properties.

6 Claims, 10 Drawing Sheets

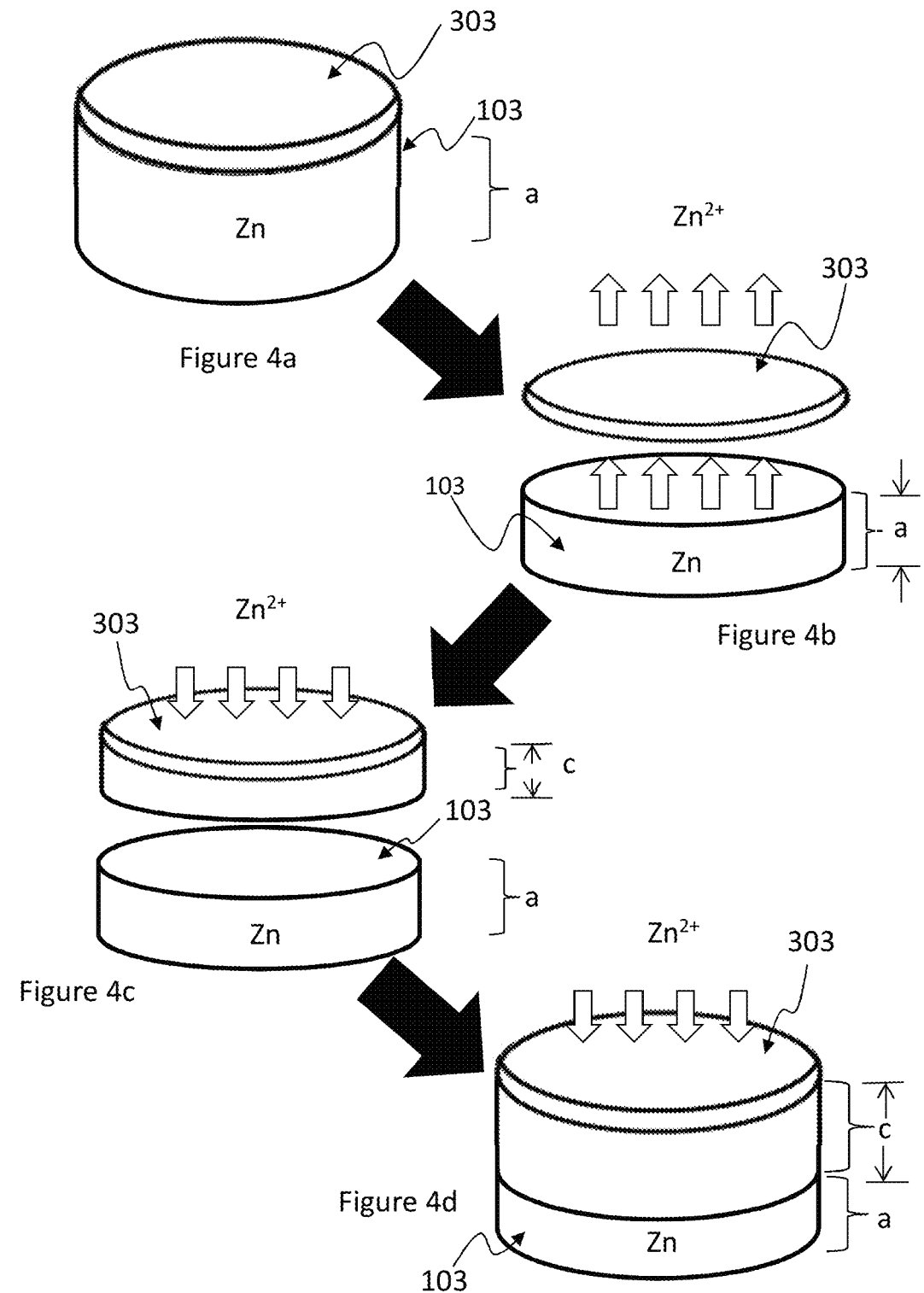

ARTIFICIAL ZINC FLUORIDE SOLID ELECTROLYTE INTERLAYER ENABLED COMMERCIAL-LEVEL AQUEOUS Zn METAL BATTERIES

CROSS-REFERENCE TO RELATED APPLICATIONS

This application claims priority to Provisional U.S. Application No. 63/130,193, filed in the United States Patent and Trademark Office on Dec. 23, 2020 entitled, "An Artificial Zinc Fluoride Solid Electrolyte Interlayer Enabled Commercial-Level Aqueous Zn Metal Batteries", which is incorporated herein by reference in its entirety.

TECHNICAL FIELD OF THE INVENTION

The invention relates to the field of zinc (Zn) batteries. In particular, the present invention relates to a zinc fluoride ($ZnF_2$) solid electrolyte interlayer (SEI) with high $Zn^{2+}$ transfer number (0.65) to isolate Zn metal from liquid electrolyte

BACKGROUND

Zinc (Zn) batteries are known to deteriorate over time due to formation of dendrites and parasitic hydrogen evolution. The causes of dendrite formation include preferential site deposition on the zinc anode surface.

Generally, zinc is deposited from the electrolyte onto the battery anode during charge cycle. However, if a particular spot on the surface of the zinc anode is deposited with more zinc, that particular spot easily encourages further deposition to be made over it. Eventually, continual deposits build up into finger-like zinc structures that extend towards the cathode, known as dendrites. Dendrites can short the battery if the dendrites grow toward and reach the cathode.

Up to now, strategies for supressing dendrite-free zinc deposition and/or parasitic hydrogen evolution is mainly limited to electrolyte optimization, artificial SEI or the fabrication of three-dimensional (3D) current collectors. Although, to some extent, these strategies can supress dendrites in lab-scale batteries, these strategies are still far from being effective in industrial-scale, commercial batteries, and are unable to mitigate unsatisfactory battery performance. Furthermore, these methods are costly.

Therefore, it is desirable to propose a suitable cathode and/or organic electrolyte that could provide stable, high performing zinc ion batteries that is less susceptible to dendrite-related performance deterioration.

STATEMENT OF INVENTION

In a first aspect, the invention proposes a battery comprising: a Zn electrode coated with a layer of $ZnF_2$ by vapour deposition; and an aqueous electrolyte.

Optionally, the battery further comprises an $\alpha$-$MnO_2$ electrode. Preferably, the aqueous electrolyte comprises $ZnSO_4$.

Optionally, the battery further comprises: a further Zn electrode coated with a layer of $ZnF_2$ by vapour deposition; one Zn electrode being the anode; the further Zn electrode being the cathode; wherein the aqueous electrolyte is κ m $KOH+0.2$ m $Zn(AC)_2$ In a second aspect, the invention proposes a method of making zinc coated with zinc fluoride, suitable for use as an electrode in a aqueous zinc battery, comprising the steps of: providing a piece of zinc; polishing a surface of the piece of zinc; placing the piece of zinc together with $NH_4F$ powder in a sealed enclosure comprising a vacuum atmosphere; and heating the sealed 180° C. for 12 h.

Optionally, the piece of zinc is a 0.2 mm thick Zn disc with a diameter of 14 mm. Preferably, one side of the Zn disc is carefully polished with 1000 mesh sandpaper to remove the passivation layer.

In a third aspect, the invention proposes a $Zn@ZnF_2$// $Zn@ZnF_2$ battery comprising: (a) Two $Zn@ZnF_2$ electrodes; and (b) 2 M $ZnSO_4$ aqueous electrolyte.

Preferably, the cells are cycled at 1, 2 and 5 mA cm$^{-2}$ with 1 mAh cm$^{-2}$ of the Zn reversibly cycled. The $Zn@ZnF_2$// $Zn@ZnF_2$ cells show superior performance with a cycle life of >2500 h, where 2500 mAh cm$^{-2}$ cumulative capacity is cycled.

The $Zn@ZnF_2$//$Zn@ZnF_2$ battery of claim 9, wherein even at high rate of 10 mA cm$^{-2}$ with 10 mAh cm$^{-2}$ of the Zn reversibly cycled, $Zn@ZnF_2$//$Zn@ZnF_2$ cell can be operated steadily for ~590 h without apparent irreversible voltage observed.

In yet a further aspect, the invention proposes a $Zn@ZnF_2$//$MnO_2$ battery comprising: (a) A $Zn@ZnF_2$ electrode; (b) 2 M $ZnSO_4+0.2$ M $MnSO_4$ aqueous electrolyte; and (c) A $MnO_2$ electrode.

Advantageously, the $Zn@ZnF_2$//$MnO_2$ battery (~3.2 mAh cm$^{-2}$) is capable of cycling stability over 1000 cycles with 93.63% capacity retained at ~100% coulombic efficiency.

Furthermore, a 850 mAh can operate over 160 cycles (800 h cycling) with 93.17% initial capacity retained.

Accordingly, the invention provides the possibility of mitigating the problem of unstable Zn anode in an aqueous electrolyte, by proposing use of the $ZnF_2$ as ion conductor.

BRIEF DESCRIPTION OF DRAWINGS

It will be convenient to further describe the present invention with respect to the accompanying drawings that illustrate possible arrangements of the invention, in which like integers refer to like parts. Other embodiments of the invention are possible, and consequently the particularity of the accompanying drawings is not to be understood as superseding the generality of the preceding description of the invention.

FIGS. 4a-4d illustrate schematically the mechanism in the embodiment of FIG. 3;

DESCRIPTION OF EMBODIMENT(S)

Figure 1:
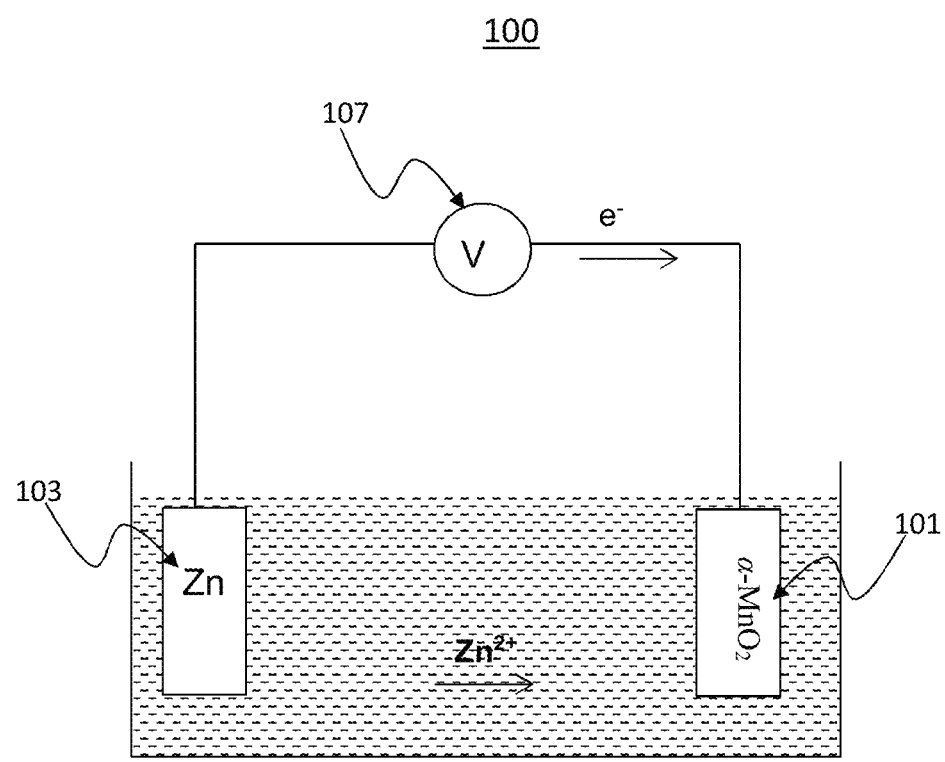
FIG. 1 illustrates schematically a prior art of the invention.

FIG. 1 shows an aqueous zinc (Zn) battery 100 according to the prior art. The cathode 101 material is manganese dioxide (a-$MnO_2$, a mineral also known as hollandite). The α-$MnO_2$ cathode is paired with a Zn anode 103.

During the discharge cycle of the battery, the Zn anode 103 is oxidised and produces Zn ions which migrate into the electrolyte solution, and which then move towards the cathode 101. FIG. 1 also shows a load 107 through which a current of the electrons yielded by the Zn anode 103 passes during the battery discharge cycle.

Figure 2A:
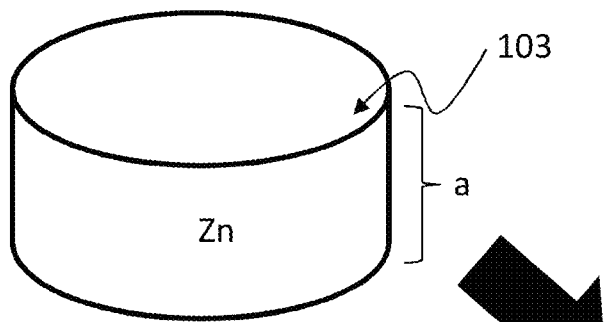
FIGS. 2a-2c illustrate schematically the mechanism in the a prior art of FIG. 1.
Figure 2B:
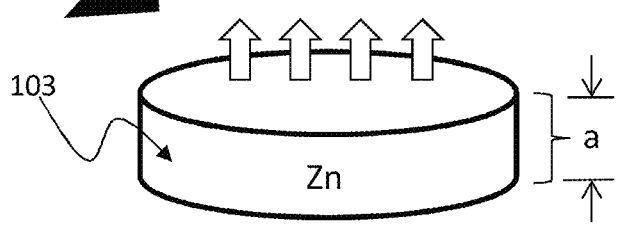
Figure 2C:
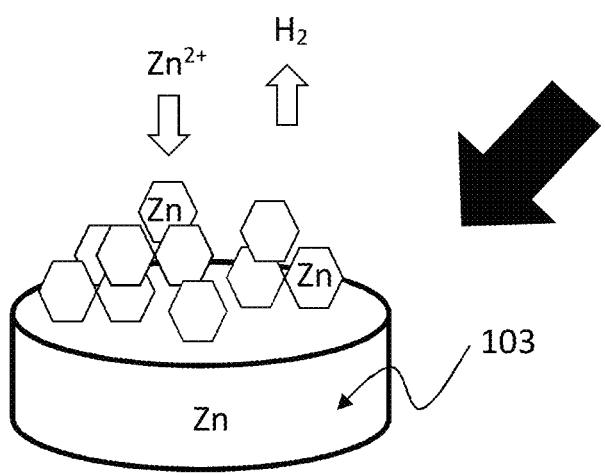

FIGS. 2a-2c shows in greater detail what happens on the surface of the Zn anode 103 of FIG. 1 during the discharge cycle. Specifically, FIG. 2a shows a disc representing the anode 103 before the discharging cycle has commenced. Before the start of the discharging cycle, the volume of the Zn electrode is as prepared and placed into the battery. FIG. 2b shows how, as the discharge continues, the anode 103 is slowly consumed and becomes thinner, because Zn is lost as ions into the electrolyte. See thickness marked (a) in FIGS. 2a and 2b.

The Zn ion battery is a secondary battery and can be repeatedly discharged and re-charged, over a plurality of cycles. FIG. 2c illustrates how, during the charging cycle, reverse Zn migration happens. That is, Zn ions in the electrolyte are attracted to, reduced and deposited on the electron-supplying surface of the Zn electrode 103. However, the deposition of Zn is not uniform across the surface of the electrode. Some parts of the Zn surface is deposited with more Zn than others, and these Zn deposits extends into the electrolyte and easily attract further deposits to form fingers of Zn called dendrites. In an actual battery, the dendrites can grow and extend past a separator between the anode 103 and cathode 101 to cause an internal short circuit in the battery. At the same time, this causes generation of hydrogen which bloats the battery.

Figure 3:
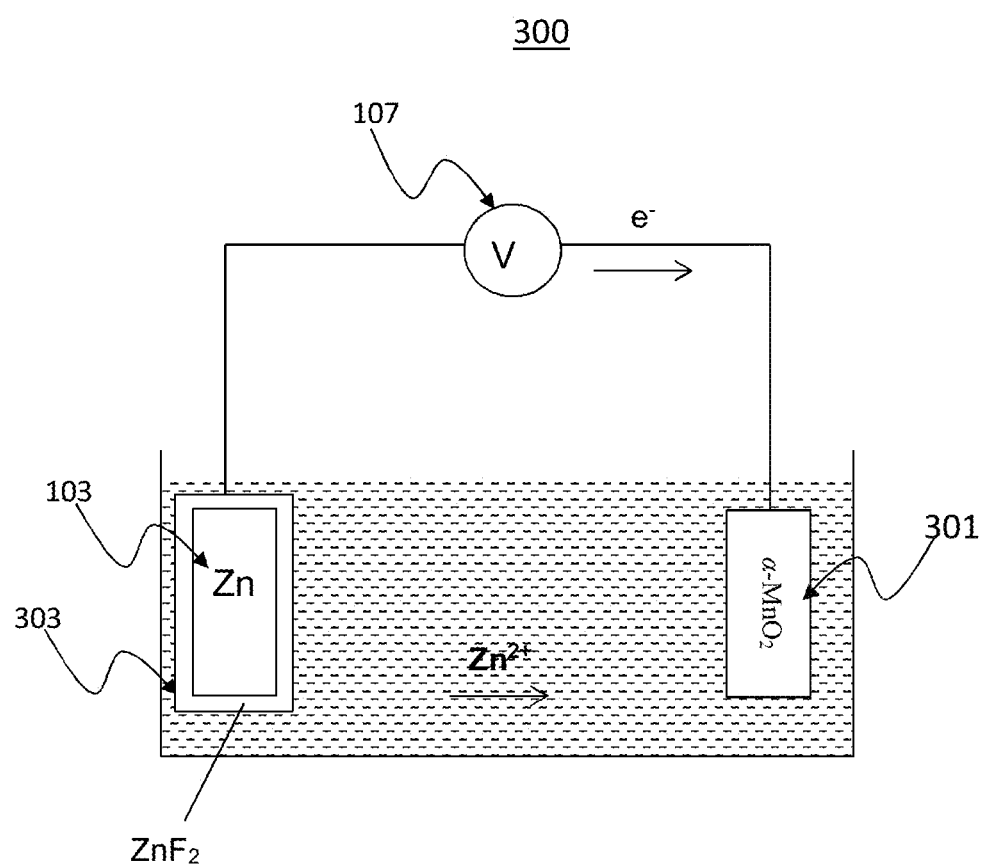
FIG. 3 illustrates schematically an embodiment of the invention.

FIG. 3 shows an embodiment 300 of the invention, and illustrates the schematic battery of FIG. 1, except that the Zn electrode 103 is now coated in zinc fluoride ($ZnF_2$), and is annotated as Zn@$ZnF_2$. The cathode 301 material is α-$MnO_2$ The electrolyte is aqueous and supplies Zn ions.

The Zn@$ZnF_2$ notation means that a layer of $ZnF_2$ as a solid electrolyte interlayer 303 (SEI) between the elemental Zn forming the anode 103 and the aqueous electrolyte.

FIGS. 4a-4d show in greater detail what happens on the surface of the Zn anode 103 of FIG. 4a during the discharge cycle. FIG. 4a illustrates original Zn electrode having thickness (a) and overlaid with a layer of $ZnF_2$ 303 before discharging. FIG. 4b shows how the Zn electrode is consumed as the Zn is oxidised and becomes thinner on being consumed. The Zn recedes away from the $ZnF_2$ SEI 303 as more zinc ions, $Zn^{2+}$, is produced.

FIG. 4c shows how Zn ions migrate across the $ZnF_2$ SEI 303 uniformly during the charge cycle, to be deposited onto the other side of the $ZnF_2$ SEI 303 evenly. This layer of Zn deposit on the $ZnF_2$ grows and extends towards to the remaining Zn 103 of the original Zn material, reducing the gap between the layer of $ZnF_2$ and the original Zn electrode which has a remaining thickness (a). Eventually, the layer of Zn on the $ZnF_2$ grows, having thickness (c), and contacts the remaining, original Zn material of thickness (a).

Preferably, the $ZnF_2$ protective layer is uniform in terms of composition and thickness, which dominates the cation transport. This provides the possibility of homogenizing transport of $Zn^{2+}$ cations toward the electrode surface. In contrast, a lumpy layer of $ZnF_2$ may possibly encourage dendrite growth.

Accordingly, the $ZnF_2$ SEI 303 prevents build-up of localised Zn deposit.

The $ZnF_2$ layer endows a dense and dendrite-free Zn deposition by regulating $Zn^{2+}$ diffusion, controlling nucleation and prohibiting the permeation of $H_2O$ and $O_2$. Therefore, the embodiment of FIG. 3 and FIGS. 4a-4d produces much less hydrogen gas than the prior art even after many battery charge and recharge cycles. The reduced hydrogen evolution provides the possibility of successful inhibition of side reactions, which improves the reversibility of electrochemical plating/stripping of metallic Zn during the respective discharge/charge cycles.

Physically, the electronically insulated $ZnF_2$ layer segregates to some extent the Zn metal in the electrode from the bulk of the liquid electrolyte, which reduces charge transfer from the Zn metal to water $H_2O$ molecules in the electrolyte.

Thereby, chemical oxidation and electrochemical hydrogen evolution at the Zn@Zn $F_2$ electrode is restrained.

In other words, the electronically insulated $ZnF_2$ layer can segregate active Zn metal from bulk liquid electrolyte and turn off charges transfer from Zn metal to $H_2O$ molecules of electrolyte, thus restraining chemical oxidation and electrochemical hydrogen evolution reaction on Zn@$ZnF_2$ electrode.

Figure 5A:
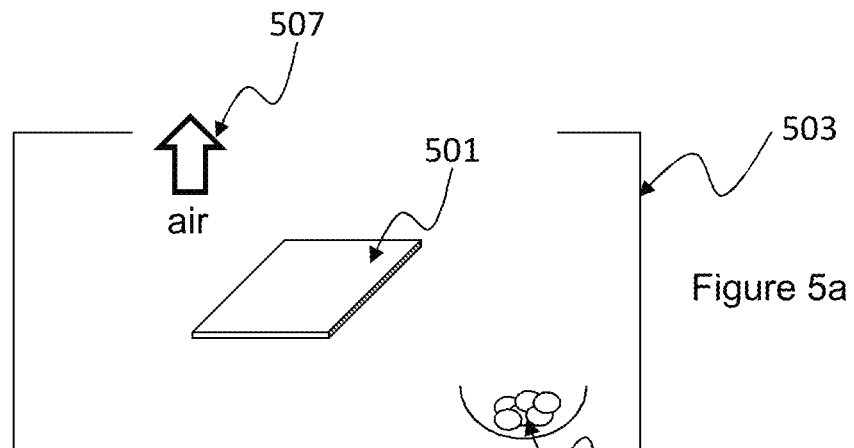
FIGS. 5a-5d illustrate the production steps for a part of the embodiment of FIG. 3.
Figure 5B:
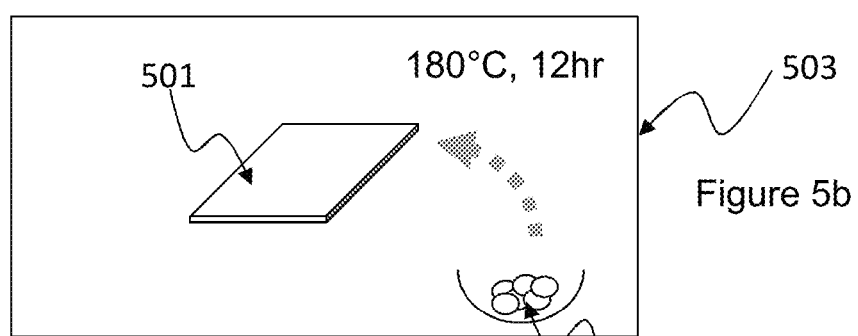
Figure 5C:
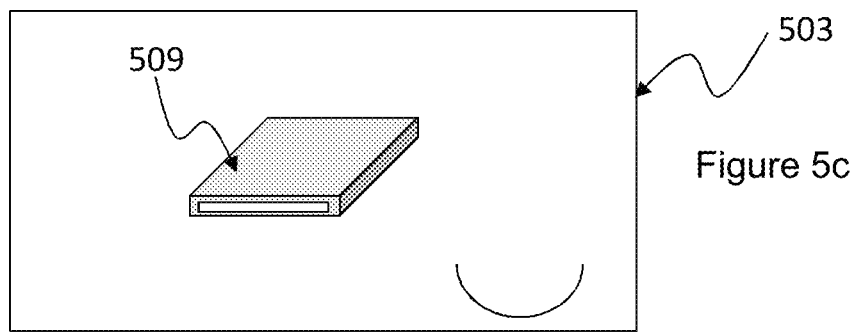
Figure 5D:
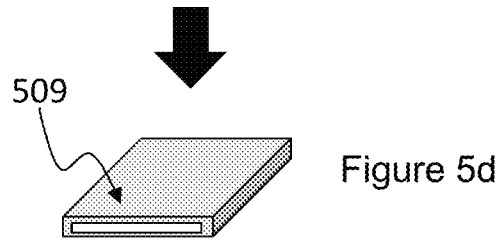

FIGS. 5a-5d schematically shows how to fabricate an even layer of $ZnF_2$ coating onto a Zn electrode. FIG. 5a shows a piece of Zn foil 501, which may be just about 0.2 mm thick, depending on the overall battery design. The surfaces of the Zn foil have been polished with 1000 mesh sandpaper to remove any passivation layer. The polished Zn foil is placed into an enclosure 503, such as a glass tube, with ammonium fluoride ($NH_4F$) powder 505 placed below the Zn foil 501. Subsequently, the air in the tube is evacuated, at 507, and the tube is sealed using an oxy-acetylene kit. After that, as shown in FIG. 5b, the enclosure is heated to 180° C. for 12 h in a muffle furnace. Upon cooling, as shown in FIG. 5c, the original Zn foil 501 is coated with $ZnF_2$. The $ZnF_2$ coated Zn foil 509 is then removed from the enclosure, as shown in FIG. 5d, ready to be used in a Zn battery.

The deposited coating is not made up of loose $ZnF_2$ particles but of a uniform coat of deposited $ZnF_2$. Use of vapour deposition improves the extent of evenness of the $ZnF_2$ surface. In contrast, if the Zn metal were coated with $ZnF_2$ particles, the side-reaction suppression effect will not be as good.

For completeness, it is mentioned that the cathode 101 is prepared as follows (not illustrated). $MnO_2$ is synthesized by a modified co-precipitation and hydrothermal method. In a typical procedure, 11 mmol Mn(CH3COO)2.4$H_2O$ is dissolved into deionised (DI) water under continuous stirring for 0.5 h. Subsequently, the above solution is added dropwise into an aqueous solution prepared by dissolving 8 mmol $KMnO_4$ into 80 mL DI water and stirring for 0.5 h. The mixed solution is then transferred to a Teflon-lined autoclave and heated at 120° C. for 12 h. After cooling, the obtained dark brown precipitate is washed several times by DI water and dried at room temperature in a vacuum oven for 8 h to finally obtain the $MnO_2$ electrode materials. The $MnO_2$ electrode materials can be pressed into an electrode layer.

Figure 6:
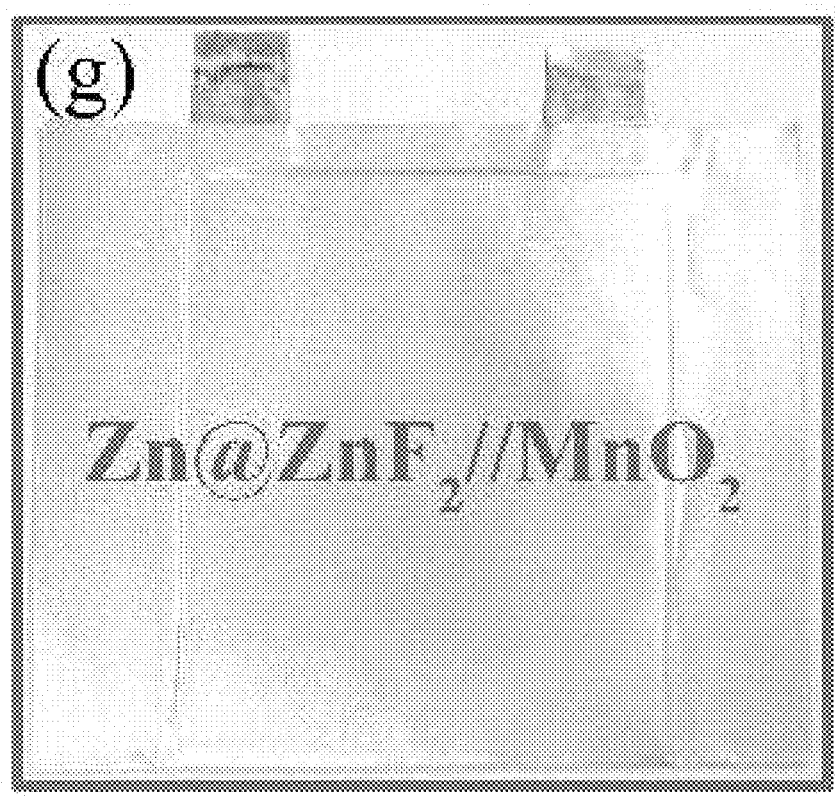
FIG. 6 is a photograph of a prototype made according to an embodiment of FIG. 3.
Figure 7:
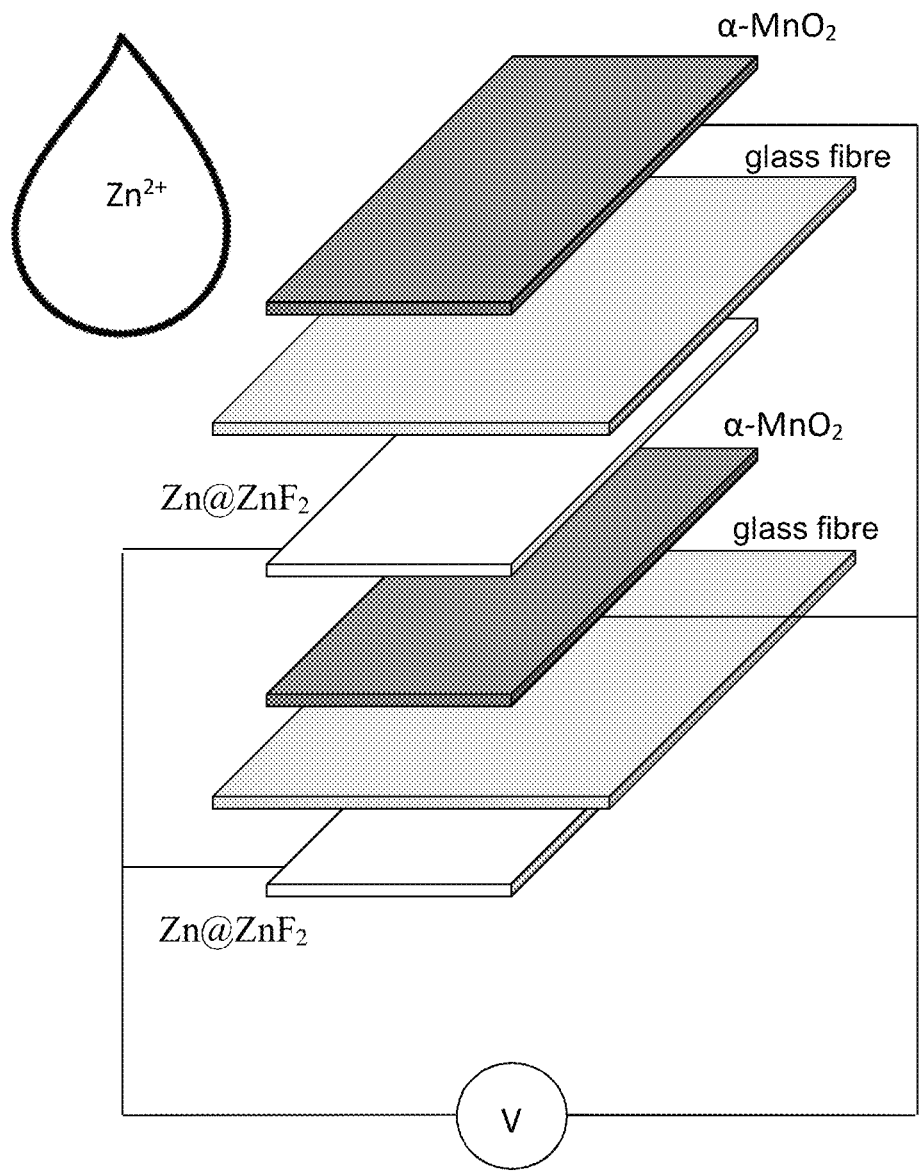
FIG. 7 is a schematic illustration of the internal structure of the prototype of FIG. 6.

FIG. 6 shows the exterior of a pouch-type battery, which is a prototype of the embodiment of FIG. 3 and FIGS. 4a-4d and is a high-energy multi-layer pouch-type battery. FIG. 7 illustrates a part of the content inside the pouch of FIG. 6, which comprises ten whole sets of anode 103-separator-cathode 101 stacks with a size of 4*6 cm². Only two such sets are shown in FIG. 7 for the sake of clarity. The separator is preferably glass fibre. The battery can be assembled in ambient air environment without risk of any complicated procedures and without requirement of special protection, unlike assembling lithium batteries. The pouch is filled with an aqueous electrolyte, illustrated as a droplet, which comprises Zn ions supplying salt, such as zinc sulphate $ZnSO_4$.

Accordingly, the described embodiments provide the possibility of an aqueous Zn battery that is capable of reduced dendrite formation and reduced hydrogen evolution because of the SEI of $ZnF_2$, compared to Zn batteries of the prior art.

Figure 8:
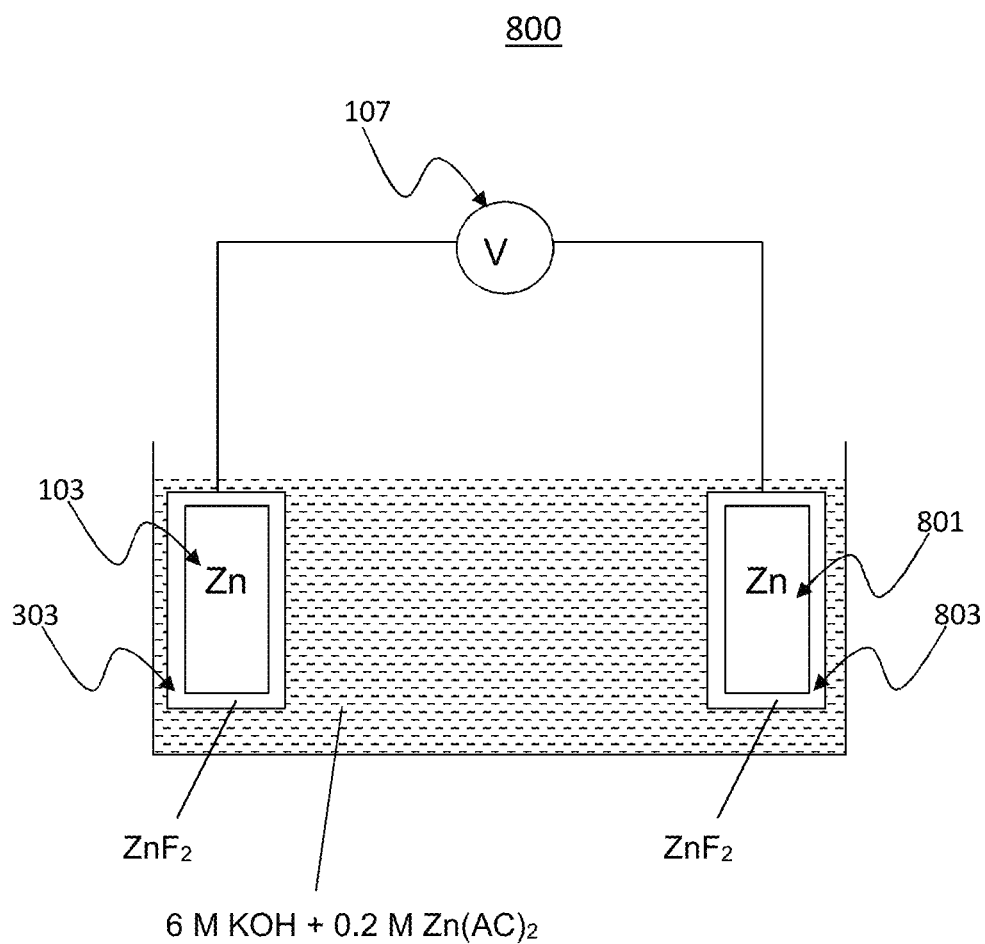
FIG. 8 illustrates schematically an embodiment alternative to that of FIG. 3.

FIG. 8 shows yet another embodiment, wherein the both the anode 103 and the cathode 801 are Zn electrodes coated with $ZnF^2$ 303, 803, i.e. a $Zn@ZnF_2//Zn@ZnF_2$ battery. The electrolyte is an alkaline electrolyte 6 M KOH+0.2 m $Zn(AC)_2$. In this embodiment the electrons simply flow from one electrode to the other through every charge and discharge cycle. The layer of $ZnF_2$ provides the possibility that both Zn electrodes remain the same size without shape distortion, and without dendrite formation for a longer period of time compared to what is possible with the prior art electrode.

Experimental Observations

The morphologies of $Zn@ZnF_2$ and bare Zn electrodes have been analysed after they were subjected to 50 cycles of stripping/plating (discharge/charge) in symmetric cells at 2 mA cm⁻² with 1 mAh cm⁻² of the Zn reversibly cycled.

Figures 9A, 9B:
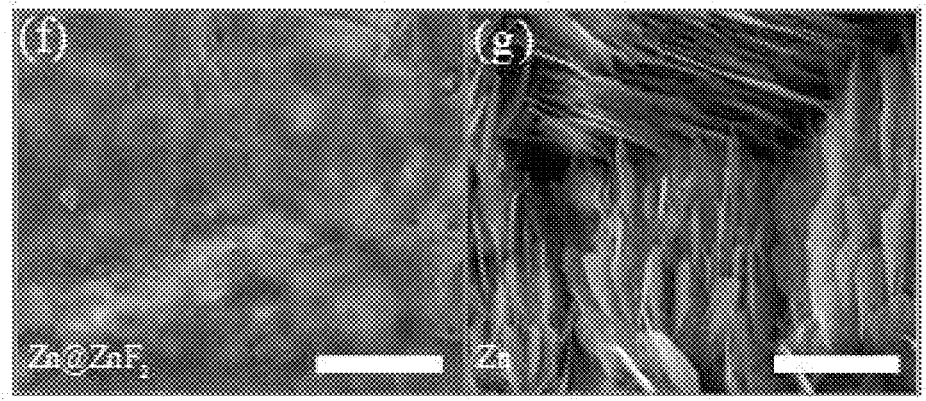
FIGS. 9a-9b show scanning electron microscope pictures of experimental observations on prototypes of made accordingly to the embodiment of FIG. 3.

The scanning electron microscopy (SEM) image in FIG. 9a shows a smooth and dense surface of deposited Zn, while the $ZnF_2$ layer remaining essentially flat even after many cycles, with no obvious dendrites. In contrast, FIG. 9b shows dendrite deposits on a bare Zn electrode merely after a few charge cycles. The dendrites formed consist of thin platelets and are highly porous.

Figures 10A, 10B:
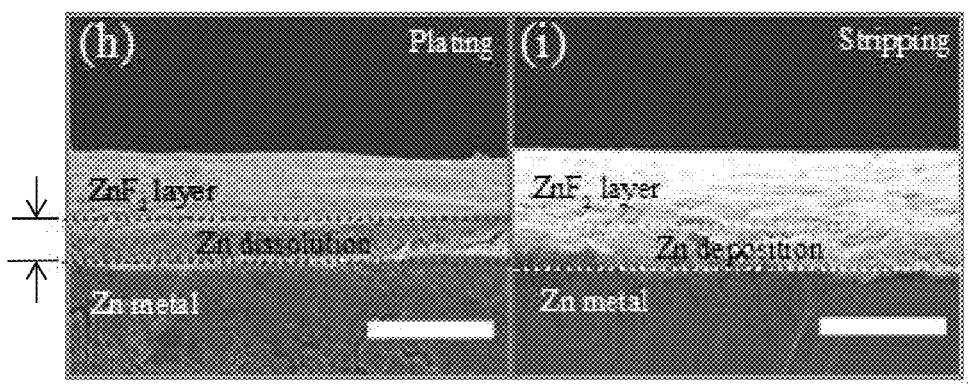
FIGS. 10a-10b show scanning electron microscope pictures of experimental observations on prototypes of made accordingly to the embodiment of FIG. 3.

FIGS. 10a-10b shows a cross-sectional SEM image. FIG. 10a shows the stripped state (discharged state) of the $Zn@ZnF_2$ electrode, in which a clear gap is visible beneath the $ZnF_2$ layer FIG. 10b shows the same the electrode in the plated state after a charging cycle, in which no gap is visible. FIG. 10b also shows that Zn deposits, which have grown on the side of the $ZnF_2$ layer facing the original zinc metal, have come into contact with the original zinc metal.

Figure 11:
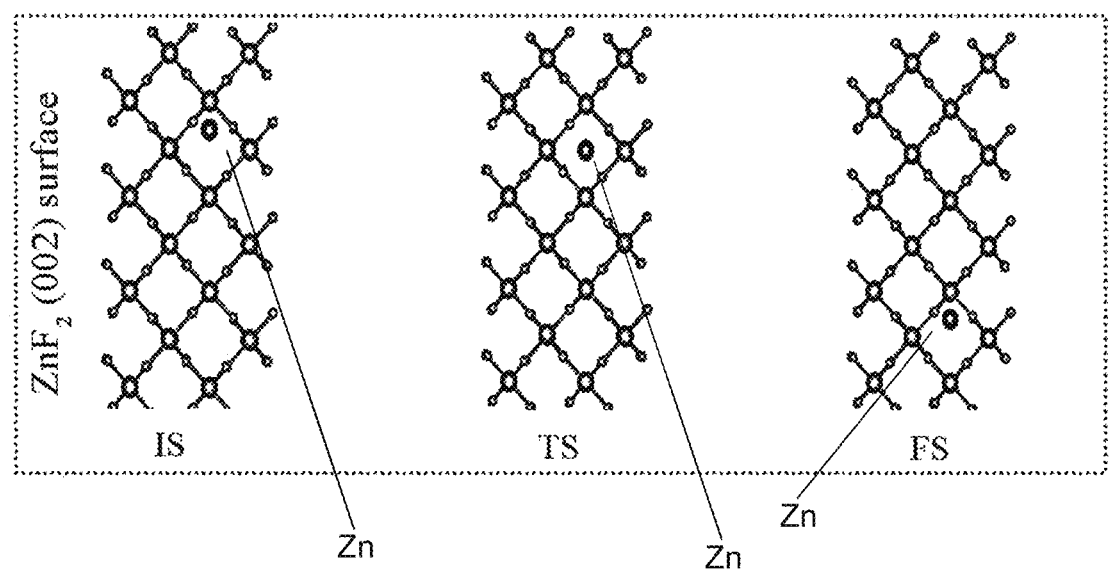
FIG. 11 illustrates the mechanism in the embodiment of FIG. 3.

FIG. 11 shows the initial state (IS), transition state (TS), and final state (FS) structures of $Zn^{2+}$ diffusion through the $ZnF_2$ (002) surface. The Zn and F atoms are shown as the criss-cross structure, and the intercalated Zn atom is shown diffusing inside the criss-cross structure from the IS, to the TS to the FS state.

The $ZnF_2$ comprises geometrically optimized F element which can distinctly induce charge transfer and redistribution at the $Zn/ZnF_2$ interface. Positive charge accumulates around Zn layer and negative charge distributes around Zn—F bonds. This can promote the formation of substantial $Zn@ZnF_2$ interface and fast $Zn^{2+}$ diffusion on the surface.

The energy barrier for $Zn^{2+}$ diffusion on $ZnF_2$ (002) surface is calculated to be 0.27 eV, while $Zn^{2+}$ hopping in bulk $ZnF_2$ represent a barrier as high as 0.76 eV determined indicating that exposed (002) surface can greatly enhance the $Zn^{2+}$ diffusion.

The lower energy barrier of $Zn^{2+}$ inserted into $Zn@ZnF_2$ can be validated by the decrease in Gibbs free energy ($\Delta G$), where the $\Delta G$ obtained for $Zn@ZnF_2$ is 0.52 eV, lower than that of Zn metal (0.67 eV). Accordingly, the $Zn@ZnF_2$ preferentially provides electrostatic attraction toward $Zn^{2+}$, accelerating the kinetics through reducing the deposition barrier.

During electrochemical process, the Zn deposition only comes up at a place, where the $Zn^{2+}$ forgather charges. Therefore, the $ZnF_2$ play a role of regulating the transport of $Zn^{2+}$ cations towards the electrode surface, without any Zn deposition on $ZnF_2$ surface.

The $Zn^{2+}$ transport flux could be dominated by $ZnF_2$ SEI during the electrodeposition. Moreover, the $Zn@ZnF_2$ electrode shows very low charge transfer resistance of 39.99 ohm, a tenth lower than that of the bare Zn electrode (412.62 ohm).

The $Zn^{2+}$ transfer number of the $ZnF_2$ reaches to 0.65, which is much larger than that of GF separator coupled with 2 M $ZnSO_4$ aqueous electrolyte (0.28). The above results suggest outstanding $Zn^{2+}$ transportation capability of the $ZnF_2$ layer.

Accordingly, he $ZnF_2$ layer does not promote isolated Zn nucleation, and the Zn deposit tends to grow on the $Zn@ZnF_2$ interface with lower inserting energy. Consequently, $Zn^{2+}$ ions is deposited into the gap between the $ZnF_2$ layer and the original Zn foil, and Zn deposition can be confined to the underside of the $ZnF_2$ layer, and thus dendrite growth is suppressed.

The $ZnF_2$ is highly permeable to $Zn^{2+}$ ions, as $Zn^{2+}$ ions are not trapped and retained in the $ZnF_2$ lattice. The energy barrier of inserting $Zn^{2+}$ into the zinc electrode overlaid with $ZnF_2$, i.e. the $Zn@ZnF_2$ lattice, has been observed to be relatively low. That is, the insertion barrier energy into $Zn@ZnF_2$ is just 0.52 eV, lower than the insertion barrier energy into $ZnF_2$ (4.08 eV) and the insertion barrier into metallic Zn surface (0.67 eV). Accordingly, the $Zn@ZnF_2$ provides electrostatic attraction to $Zn^{2+}$, which can accelerate the kinetics of passage, reducing the deposition barrier.

During the charging cycle, $ZnF_2$ is capable of directing the flux of Zn ions that flows towards the Zn surface in a laminar manner, generally well spread across the $ZnF_2$. In the prior art, Zn ions are more attracted towards the parts of the surface of the Zn electrode that has more charge which creates preferential deposits on parts of the Zn surface, causing dendrite. In the present embodiment, as $ZnF_2$ is in the way of the ion flow, the $ZnF_2$ acts as a screen that prevents accumulation of $Zn^{2+}$ cations to towards the electrode surface. This reduces localised electrodeposits and dendrites.

The $Zn^{2+}$ transfer number of $ZnF_2$ can be as high as 0.65, which is much larger than that of the glass fibre separator, in embodiments that have a 2 m $ZnSO_4$ aqueous electrolyte (0.28). Therefore, the $ZnF_2$ layer provides the possibility of relatively good $Zn^{2+}$ transportation.

Also, it has been found that $Zn@ZnF_2$ electrode has a low charge-transfer resistance of 39.99Ω, a tenth lower than that of the bare Zn electrode at 412.62Ω.

Over many cycles of discharging and charging, the plating/stripping over-potential for $Zn@ZnF_2$ is only 56.4 mV, which is significantly lower than that of bare Zn (238.9 mV). This provides excellent reversibility and cyclic lifespan that with good suppression of dendrite and hydrogen evolution. The outstanding reversibility of Zn deposition/dissolution with low overpotential originates from high ionic conductivity and fast ion diffusion of $ZnF_2$ solid in $Zn^{2+}$-ion conductor as well as good stability of $ZnF_2$ layer in aqueous environment.

It has been found that a battery of this embodiment can be cycled over 400 h at 2 mA cm⁻² and 140 h at 5 mA cm⁻² with 1 mAh cm⁻² of Zn reversibly cycled in an alkaline electrolyte of (6 m KOH+0.2 m Zn(AC)2). In sharp contrast, after only<10 h plating/stripping cycles with Zn//Zn cell in the same condition, a sudden polarization occurs due to intensified Zn-dendrite formation. Accordingly, the described embodiments provide the possibility of superior reversible cycling performance using either mild or alkaline electrolytes.

In contrast, Zn@$ZnF_2$ electrode coated with commercial $ZnF_2$ powders, instead of being coated a flat layer of $ZnF_2$ deposit, induces fast dendrite formation and growth, leading to only≈290 h cycling stability of symmetric cells in mild electrolyte, much lower than bare Zn electrode-based cells (600 h).

Accordingly, the embodiments described provide the possibility of producing aqueous secondary zinc batteries capable of being discharged and recharged.

Also, the embodiments include a compact and homogeneous zinc fluoride ($ZnF_2$) SEI layer utilizing an in-situ ion metathesis method. At the Zn/$ZnF_2$ interface, the F atoms of $ZnF_2$ layer tightly bond with Zn atoms of Zn metal, giving the credit to the charge migration between Zn and F atoms and charge redistribution. Meanwhile, the Zn@$ZnF_2$ interface exhibits a much higher ΔGH value for hydrogen evolution side reaction.

The Zn/$ZnF_2$ interface provides an artificial SEI at the Zn/electrolyte interface that allows plating of Zn dendrite free and protects the Zn metal anode from direct exposure to bulk aqueous electrolyte. This provides the advantage that the interfacial $Zn^{2+}$ ion transport is regulated, which controls nucleation distribution and the growth pattern of Zn deposition on the surface of the anode, and also improve inherent $H_2O/O_2$ resistant properties.

As a result, the obtained composite (denoted as Zn@$ZnF_2$) enables long-term Zn dendrite-free plating/stripping and prevent the fresh Zn metal from contacting with $H_2O$ molecular in the bulk electrolyte, avoiding side reactions of hydrogen evolution and Zn corrosion. Consequently, the dendrite-free and side reaction-free Zn anode enable Zn@$ZnF_2$//Zn@$ZnF_2$ symmetric cell cycling over 2500 h even at high current density of 5 mA $cm^{-2}$ with a areal capacity of 1 mAh $cm^{-2}$ and commercial-level Zn@$ZnF_2$//$MnO_2$ full cell operates 1000 cycles with 93.63% capacity retained even at high areal capacity of 3.2 mAh $cm^{-2}$. Finally, an 850 mAh Zn@$ZnF_2$//$MnO_2$ large-capacity battery exhibits excellent cycling stability over 160 cycles with 93.17% capacity retention, far outperforming Zn//$MnO_2$ (failed after only 15 cycles) in same condition.

The invention claimed is:

1. An aqueous Zn battery comprising:
   an anode, which is a first Zn electrode coated with a layer of $ZnF_2$ by vapour deposition;
   a cathode, which is a second zinc electrode coated with a layer of $ZnF_2$ by vapour deposition; and
   an aqueous electrolyte comprising KOH and $Zn(Ac)_2$ zinc ions.

2. The aqueous Zn battery as claimed in claim 1, further comprising:
   an additional 1 to 9 of the anodes;
   an additional 1 to 9 of the cathodes; and
   1 to 10 separators;
   wherein, the anodes, the cathodes, and the separators are taken together to form 1 to 10 sets of anode-separator-cathode stacks, with the separator in each stack being disposed between the anode and the cathode.

3. A method of making an electrode suitable for use in an aqueous zinc battery, comprising the steps of:
   providing a piece of zinc;
   polishing a surface of the piece of zinc;
   placing the piece of zinc together with $NH_4F$ powders in a sealed enclosure comprising a vacuum atmosphere; and
   heating the sealed enclosure to 180° C. for 12 h to vapour deposit a layer of $ZnF_2$ on the piece of zinc thereby producing the electrode.

4. The method as claimed in claim 3, wherein the piece of zinc is in disc form with a thickness of 0.2 mm and a diameter of 14 mm.

5. The method as claimed in claim 4, wherein the surface of the Zn disc is carefully polished with 1000 mesh sandpaper to remove the passivation layer.

6. The aqueous Zn battery as claimed in claim 2, wherein the separator is a glass fiber.

* * * * *

UNITED STATES PATENT AND TRADEMARK OFFICE
CERTIFICATE OF CORRECTION

| | |
|---|---|
| PATENT NO. | : 12,034,154 B2 |
| APPLICATION NO. | : 17/561273 |
| DATED | : July 9, 2024 |
| INVENTOR(S) | : Chunyi Zhi et al. |

It is certified that error appears in the above-identified patent and that said Letters Patent is hereby corrected as shown below:

In the Claims

Column 8, Line 8, cancel the text beginning with "1. An aqueous Zn battery comprising:" to and ending "an aqueous electrolyte comprising KOH and $Zn(Ac)_2$ zinc ions." in Line 13-14, and insert the following claim:
--1. An aqueous Zn battery comprising:
an anode, which is a first Zn electrode coated with a layer of $ZnF_2$ by vapour deposition;
a cathode, which is a second zinc electrode coated with a layer of $ZnF_2$ by vapour deposition; and
an aqueous electrolyte comprising KOH and $Zn(Ac)_2$.--

Signed and Sealed this
Third Day of September, 2024

Katherine Kelly Vidal
*Director of the United States Patent and Trademark Office*